June 9, 1964 P. A. KRISTENSEN ETAL 3,136,929

SUPERPOSED PRINTED CONDUCTORS THROUGH MAGNETIC CORES

Filed April 15, 1960

INVENTORS
PAUL A. KRISTENSEN
THOMAS D. ROSSING
CHARLES W. LUNDBERG

BY Cushman, Darby & Cushman
ATTORNEYS

United States Patent Office 3,136,929

Patented June 9, 1964

3,136,929

SUPERPOSED PRINTED CONDUCTORS THROUGH MAGNETIC CORES

Paul A. Kristensen, Arden Hills, Thomas D. Rossing, Northfield, and Charles W. Lundberg, Minneapolis, Minn., assignors to Sperry Rand Corporation, New York, N.Y., a corporation of Delaware Filed Apr. 15, 1960, Ser. No. 22,589
10 Claims. (Cl. 317—158)

This invention relates to an improved magnetic core having superposed conductors arranged to extend through the aperture of one or more of an apertured type core, such as the conventional bistable ferrite toroid.

In the fabrication of ferrite toroidal core arrays, such as used in digital computer coincident-current memory systems, it is necessary to have a multiplicity of conductors running through the usual aperture of each of the toroids. The small dimensions of the toroidal cores, which are conventionally used, along with the large quantity of such cores in an array makes this task burdensome and time consuming when using conventional circular wire conductors. This invention reduces the burden by coupling the cores with printed circuit conductors in multiple layers within the toroid apertures.

A typical core array might consist of 4096 toroidal cores arranged in 64 equally spaced rows with each row containing 64 cores. Through each core in the array, four conductors must be placed and these conductors must be continuous through all 4096 cores or at least through 64 cores. Because of the small diameter of the core aperture it is extremely difficult to string very many circular conductors through a core in proper orientation. The use of printed wiring relieves some of the space problems so as to permit the use of a greater number of conductors through the aperture.

In accordance with this invention, one or more apertured cores are held edgewise into a resin to a small depth while the resin sets. Then a copper layer is deposited onto the resin and "printed" to effect a desired conductor configuration. Further superposed dielectric and conductor layers may be manufactured therein in a similar manner.

It is therefore an object of this invention to provide an improved core having a plurality of superposed insulated conductors extending through the aperture of one or more apertured cores.

Another object of the invention is to provide for a large increase in the number of conductors which may be placed through an aperture in a toroidal or like type magnetic core.

Still another object of the invention is to facilitate the placement of superposed conductors through one or more magnetic core apertures.

Still other objects of this invention will become apparent to those of ordinary skill in the art by reference to the following detailed description of the exemplary embodiments of the invention and the appended claims. The various features of the exemplary embodiments according to the invention may be best understood with reference to the accompanying drawings, wherein:

Figure 1:
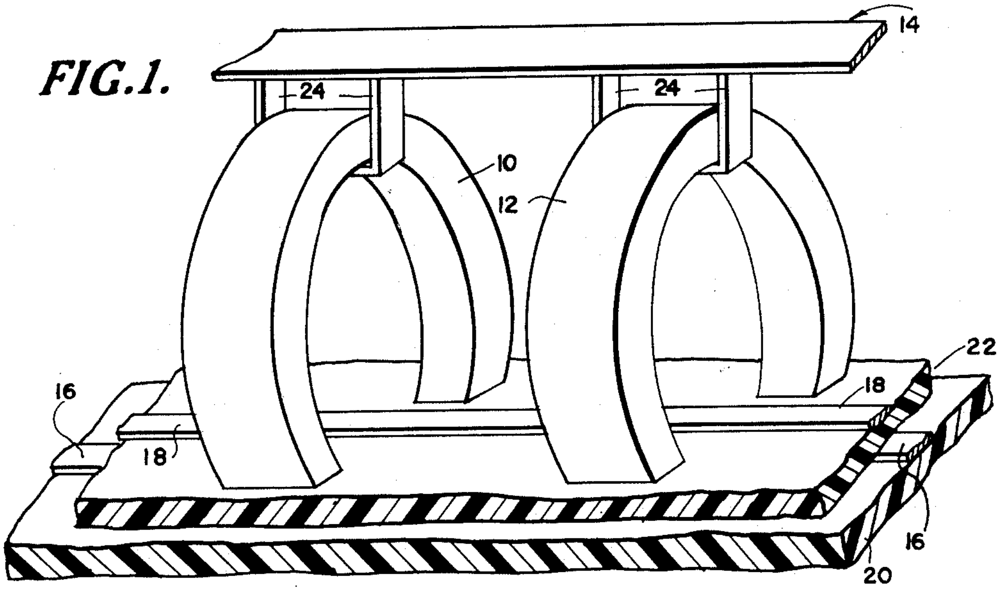
FIGURE 1 illustrates the apparatus or product as obtained by the teachings of the process feature of this invention, in conjunction with a core holding fixture.

As above indicated, the prior art toroidal cores, particularly when employed in a matrix, require a multiplicity of conductors threaded through their respective aperture.

In particular, four conductors are commonly employed, the "X" drive line, the "Y" drive line, the sense line, and the inhibit line. The function of each of these lines is well known in the art and need not be further described here. In a matrix, the "X" and "Y" drive lines are each continuous through all the cores in a single row or column, the inhibit line or lines couple all the cores in the matrix, and the sense line is continuous through all the cores. In the prior art, these lines are in the form of circular wire conductors, and each is placed through a core aperture in turn. Therefore, the space remaining in the aperture of any core after another conductor is placed therethrough, decreases thereby increasing the difficulty of guiding a subsequent conductor through the aperture. In a commonly used 64 x 64 magnetic core array, cores with an aperture diameter of .030 inch may be employed along with insulated solid wires each of which have a total diameter of approximately .007 inch. Generally, the center-to-center spacing between the cores is .050 inch. The burden placed upon a human operator in guiding the conductors successively through the core apertures in such an array is readily apparent. It might be said to be analogous to stringing four threads through 4096 needle holes in close proximity to each other.

In accordance with this invention, the threading of conductors one by one through core apertures is eliminated, by effecting a plurality of superposed printed conductors through the core apertures continuous from one core to the next. Exemplary of two cores, which may be part of a larger core matrix, as manufactured in accordance with this invention, is the illustration of FIGURE 1. As will be later described in more detail, the toroidal cores 10 and 12 are initially held in an upright, or on-edge, position by a holder 14. This holder is preferably removed after the printed circuit conductors are formed through the core apertures, and is not a part of the resulting product formed by the process of this invention. The product does include, however, at least two printed circuit conductors 16 and 18 each of which is continuous through the aperture of both of cores 10 and 12, and the respective dielectric or insulating layers 20 and 22. Of course, more than the two dielectric-conductor layers may result in the product according to the number of conductors desired for the particular use to which the product may be put.

Figure 2:
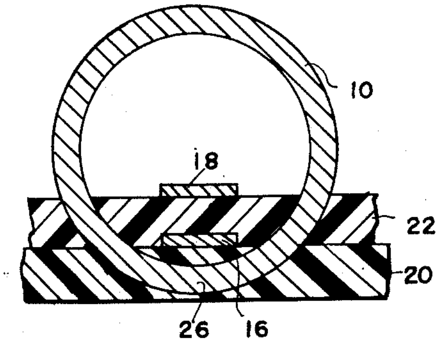
FIGURE 2 is a cross-sectional view of one of the cores and printed conductor resin layers without the core holding fixture.

To form the product shown in FIGURE 1 or the single core product shown in cross-section in FIGURE 2, the following steps may be employed. First, the core or cores are properly oriented in some type of holding fixture such as fixture 14 shown in FIGURE 1. The depending arms 24 may, for example, be spring biased so that each pair can be spread for insertion of the core. In this manner, the relative orientation of the cores is fixed and they are prepared for edgewise partial submersion into a fluid resin layer. This layer of resin, and the later mentioned resin layers, may be an epoxy type polymer resin such as a bisphenol A-epichlorhydrin resin examples of which are sold under the trademark "Epon No. 828" by the Shell Chemical Corporation or "Sealcast No. 502" sold by Minneapolis-Honeywell Regulator Company. These resins are substantially non-shrinking, and can be made even more so, if desired, by adding fillers, e.g., glass, but need not be. Other suitable non-shrinking resins are the filled polyester resins such as described in the Sergovic Patent No. 2,751,775.

Figure 3:
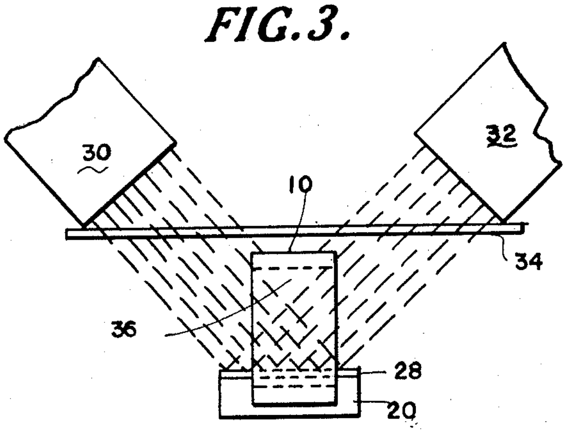
FIGURE 3 illustrates one step in the process of printing a conductor through a core aperture.

As will be noted mainly in FIGURE 2, the core 10 is immersed in the resin layer 20 only to a small depth sufficient to recover the lower side 26 of the core so that the top surface of the resin layer 20 is in the "donut hole" or aperture of the core. While the core is being held in the resin layer 20, the resin is set or cured in conventional fashion. Conductor 16 is then formed atop the resin layer 20. This may be done by any of the conventional printed circuit techniques along with the aid of masking and angulated sources of collimated light, as shown in FIGURE 3. Initially, it is preferable to deposit a thin film of copper onto the cured resin layer 20. This may be accomplished chemically or by vacuum condensation. Then, an additional layer of copper is deposited over the copper film to the required depth. This additional copper layer is preferably electroplated onto the copper film, but it also may be deposited by vacuum condensation techniques. The purpose of the copper film is to form a base for the thicker layer of copper. Alternatively, vacuum condensation techniques may be employed to deposit all of the copper.

To the surface of the resulting copper layer 28, there is then applied a conventional photo-resist type material. This material is subsequently exposed to collimated light as emanating from sources 30 and 32, through mask 34 in which there is a pattern of the desired conductor configuration. In normal printed circuit techniques, the patterned mask is placed directly in contact with the copper surface. Since core 10 protrudes above the copper layer 28, it is not possible to place the mask in juxtaposition to the copper surface. Collimated light is therefore required to give good line definition on the photo-resist material. Since the copper running through the core aperture must also be exposed to the light source and since the core acts as a light shield, the light must be placed at an angle with respect to the copper surface. Further, since a single light source would produce undesirable shadow effects, at least one other source of collimated light is employed.

After the surface of copper layer 28 has been exposed to the light through the mask, it is subjected to any well known etching process whereby the undesirable copper is etched away leaving only the desired conductor and the resin.

To add the second conductor 18, a second layer of resin is deposited atop the first layer and its conductor with the remaining steps above indicated being repeated, until the second conductor is formed. Other layers of copper coated resin may be added in like manner until the required number of conductors has been achieved. More than one conductor may be placed on the surface of a resin layer, if desired, dependent of course upon the desired conductor width and core aperture width at the surface of the resin. The total number of layers depends on the copper and resin thickness. A typical overall layer thickness, including copper and resin, is approximately .002 inch, so that in a .030 inside diameter core, 15 layers could be inserted. Practically speaking, however, there is a limitation to approximately 10 layers since the collimated light rays can only be effective to a certain height within the core aperture. That is, with angulated sources of collimated light shielded by the top of the core, there is an area 36 which cannot be reached by either of the sources of light limiting the number of conductors which can be printed within the core.

Once the required number of superposed conductors is printed, the holder 14 of FIGURE 1 may be removed and the resulting core or cores placed into use. It may be noted that the printed circuit conductors 16 and 18 run substantially parallel to the core aperture axis which is in turn substantially perpendicular to the face plane of either core. As developed, the apparatus may be employed in conjunction with coincident current memory arrays as above indicated, though it may instead be employed in any system which requires the passing of a multiplicity of electrical conductors through an aperture of a core.

Although it has been above indicated that the dielectric layer 22 is a resin, it and any subsequent dielectric layers may be made of any desirable insulation material other than resins, since resin layer 20 generally provides sufficient adhesion to any core. For example, layer 22 may be of silicon monoxide, magnesium fluoride, or any similar dielectric. Any such material may be evaporated and condensed in vacuum into layer form in place of resin layer 22 or any succeeding insulation layer, with the resulting layer being much thinner than a resin layer if desired.

It is therefore apparent that the various objects and advantages of this invention have been successfully achieved.

Modifications of this invention will become apparent to those skilled in the art after reading this application and such are to be included within the scope of this invention in accordance with the following claims, no limitation to the species of the foregoing description and drawings being intended.

What is claimed is:

1. Apparatus including at least one apertured magnetic core and a plurality of insulated layers having superposed printed circuit conductors extending axially through an aperture of said core, the core being disposed edgewise through the surface of the insulation and substantially normal to the plane of the insulation whereby the insulation inscribes at least a portion of said core therein.

2. Apparatus including at least one apertured magnetic core having secured thereto a plurality of insulated layers having superposed printed circuit conductors extending axially through an aperture of said core, the core being disposed edgewise through the surface of the insulation of said printed circuit and substantially normal to the plane of said insulation whereby the insulation inscribes at least a portion of said core therein.

3. Apparatus including at least one magnetic core having an aperture whose axis extends transversely of a face plane of the core and a plurality of superposed substantially parallel insulated layers having printed circuitry extending substantially parallel with said axis and separated one from the other and from one side of said core by respective dielectric layers at least one of which is of cured resin, the conductors of said printed circuitry extending axially through an aperture of said core, the cores being disposed edgewise through the surface of said dielectric layers and substantially normal to the planes of said dielectric layers whereby the dielectric layers inscribe at least a portion of said core therein.

4. Apparatus comprising a plurality of apertured magnetic cores and a plurality of superposed substantially parallel insulated layers having printed conductors each extending axially continuously through a plurality of apertures of different cores and being separated one from another and from one side of each of the cores through which they extend by respective layers of insulation at least one of which is set resin, the cores being disposed edgewise through the surface of the insulation and substantially normal to the plane of the insulation whereby the insulation inscribes at least a portion of each of said cores therein.

5. Apparatus as in claim 3 wherein the dielectric layer separating its respective printed circuit layer from said one side of the core is comprised of said cured resin, and at least one other of the said dielectric layers also comprises cured resin.

6. Apparatus as in claim 3 wherein the dielectric layer separating its respective printed circuit layer from said one side of the core is comprised of said cured resin, and at least one other of the said dielectric layers comprises silicon monoxide.

7. Apparatus as in claim 3 wherein the dielectric layer separating its respective printed circuit layer from said one side of the core is comprised of said cured resin, and at least one other of the said dielectric layers comprises magnesium fluoride.

8. Apparatus as in claim 4 wherein the insulation layer separating a printed conductor layer from said one side of each core comprises said cured resin, and at least one other of the said insulation layers also comprises cured resin.

9. Apparatus as in claim 4 wherein the insulation layer separating a printed conductor layer from said one side of each core comprises said cured resin, and at least one other of the said insulaiton layers comprises silicon monoxide.

10. Apparatus as in claim 4 wherein the insulation layer separating a printed conductor layer from said one side of each core comprises said cured resin, and at least one other of the said insulation layers comprises magnesium fluoride.

References Cited in the file of this patent

UNITED STATES PATENTS

| | | |
|---|---|---|
| 2,348,055 | Chapman | May 3, 1944 |
| 2,914,840 | Damiano | Dec. 1, 1959 |
| 2,945,289 | Spencer | July 19, 1960 |
| 2,955,238 | Habegger | Oct. 4, 1960 |
| 2,984,825 | Fuller et al. | May 16, 1961 |
| 3,028,447 | Flaschen et al. | Apr. 3, 1962 |
| 3,064,334 | Gessner | Nov. 20, 1962 |